United States Patent
Zimmerman et al.

(10) Patent No.: US 7,585,017 B2
(45) Date of Patent: Sep. 8, 2009

(54) ONE-PIECE, TUBULAR MEMBER WITH AN INTEGRATED WELDED FLANGE AND ASSOCIATED METHOD FOR PRODUCING

(75) Inventors: Jim Zimmerman, Grosse Ile, MI (US); Tad Machrowicz, Ortonville, MI (US)

(73) Assignee: Noble Advanced Technologies, Inc., Warren, MI (US)

( * ) Notice: Subject to any disclaimer, the term of this patent is extended or adjusted under 35 U.S.C. 154(b) by 455 days.

(21) Appl. No.: 11/430,373

(22) Filed: May 9, 2006

(65) Prior Publication Data

US 2006/0255624 A1 Nov. 16, 2006

Related U.S. Application Data

(60) Provisional application No. 60/679,509, filed on May 10, 2005.

(51) Int. Cl.
    *B62D 25/06* (2006.01)
(52) U.S. Cl. .............................. 296/193.06; 296/203.03
(58) Field of Classification Search ............... 52/731.3, 52/4, 5; 296/205, 203.03, 193.06
    See application file for complete search history.

(56) References Cited

U.S. PATENT DOCUMENTS

| 4,038,109 | A | * | 7/1977 | Pflieger et al. ............... 148/219 |
| 4,838,606 | A | * | 6/1989 | Furubayashi et al. ... 296/187.12 |
| 5,988,734 | A | | 11/1999 | Longo et al. |
| 6,364,973 | B1 | | 4/2002 | Golle et al. |
| 6,475,307 | B1 | | 11/2002 | Nystrom et al. |
| 6,533,348 | B1 | | 3/2003 | Jaekel et al. |
| 6,578,909 | B1 | * | 6/2003 | Reed et al. ................... 296/210 |
| 6,595,579 | B2 | | 7/2003 | Freitag et al. |
| 6,692,065 | B2 | | 2/2004 | Yamamoto et al. |
| 6,723,175 | B2 | * | 4/2004 | Hanakawa et al. .......... 148/226 |
| 6,926,350 | B2 | | 8/2005 | Gabbianelli et al. |
| 6,979,052 | B2 | | 12/2005 | Hess et al. |
| 7,021,700 | B2 | | 4/2006 | Yoshida et al. |
| 7,144,072 | B2 | * | 12/2006 | Wallstrom et al. ..... 296/187.03 |
| 7,222,912 | B2 | * | 5/2007 | Deme et al. ............ 296/203.02 |
| 2002/0153750 | A1 | | 10/2002 | Feith et al. |
| 2002/0174921 | A1 | | 11/2002 | McNulty et al. |
| 2003/0075954 | A1 | | 4/2003 | Braitmaier et al. |
| 2005/0088012 | A1 | | 4/2005 | Yoshida |
| 2005/0258626 | A1 | | 11/2005 | Hill |
| 2006/0005503 | A1 | | 1/2006 | Bladow et al. |
| 2007/0012748 | A1 | * | 1/2007 | McCrink et al. ............. 228/101 |
| 2008/0042469 | A1 | * | 2/2008 | McNulty et al. ......... 296/183.1 |

FOREIGN PATENT DOCUMENTS

| JP | 200009514 | 4/2002 |
| WO | WO0158723 A1 | 8/2001 |

* cited by examiner

*Primary Examiner*—Dennis H Pedder
*Assistant Examiner*—Pinel E Romain
(74) *Attorney, Agent, or Firm*—Gifford, Krass, Sprinkle, Anderson & Citkowski, P.C.

(57) ABSTRACT

A structural supporting roof pillar for use in a vehicle including an elongated, interiorly hollowed and polygonal shaped body having a selected arcuate lengthwise configuration and corresponding in placement to at least one of an A, B, and C vehicle pillar. A first component supporting flange is integrally formed, such as by overlapping end portions of a roll formed body, and projecting in at least a partially lengthwise extending fashion from a given cross sectional location. A secondary component supporting flange is affixed to a further cross sectional location associated with the body, such as further by welding.

8 Claims, 2 Drawing Sheets

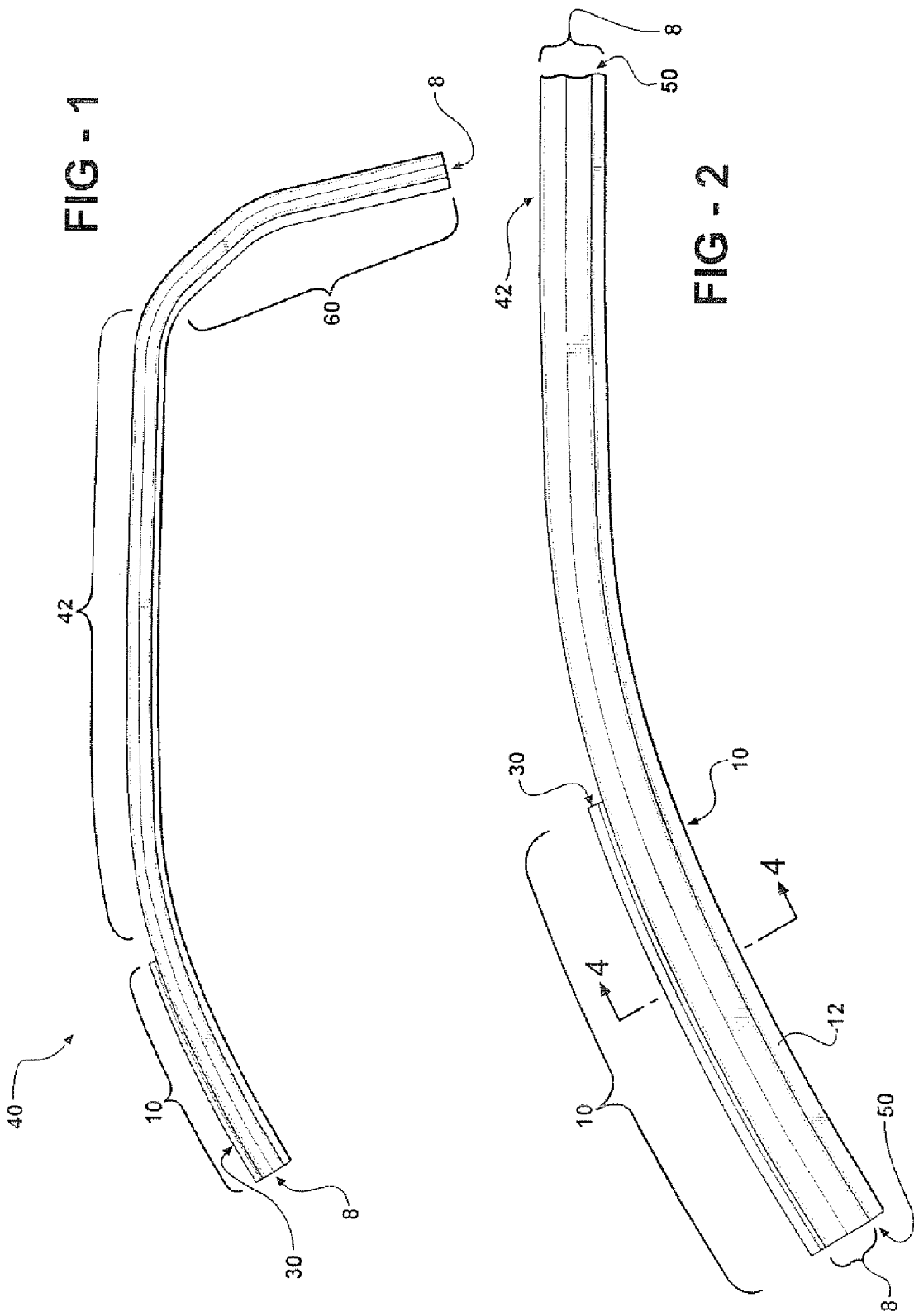

ONE-PIECE, TUBULAR MEMBER WITH AN INTEGRATED WELDED FLANGE AND ASSOCIATED METHOD FOR PRODUCING

CROSS REFERENCE TO RELATED APPLICATIONS

The present application claims the priority of U.S. Provisional Patent Application Ser. No. 60/679,509, filed May 10, 2005, and entitled One-Piece, Tubular Member with an Integrated Welded Flange.

BACKGROUND OF THE INVENTION

1. Field of Invention

Federal Regulators and Consumer Advocates are requesting higher performance in rollover, side, and frontal impacts. Their objectives are to increase buckling strength to 2.5 times vehicle weights to maintain the integrity of the passenger door apertures and passenger compartment during higher speed impacts.

The present invention relates to the manufacture of automotive impact and structural components. More, particularly, the invention discloses a front pillar structure of a vehicle adapted to reinforce the front pillar through stiffening or by way of a device for increasing the strength of a hollow shaped front pillar, which has a closed cross-section.

Typically, the automotive engineer strives to increase the strength of the roof rails, pillars, and bows while attaching this structure to a stiff foundation (e.g. frame or uni-body components). Traditional solutions usually included adding multiple sheet metal stampings of higher gage with strength, which were limited to the formability process. A tubular product always has been superior in torsional stiffness and strength; however, it could not be feasibly packaged, or attached to a non-cylindrical cavity in the vehicle, such as the pillars, which the present invention presumes to solve.

2. Description of the Prior Art

Present construction of roof rails, roof headers, rocker reinforcements, front shot-gun structure, and radiator supports, are traditionally made of several stampings comprising a portion of a structural automotive body. Recently, roof structures and radiator supports have began replacing stampings as a one-piece component made by the hydroform process.

An example of a hydro-formed space frame exhibiting a pair of laterally spaced, and longitudinally extending side rail structures is set forth in U.S. Pat. No. 6,926,350, issued to Gabbianelli et al., and which also includes a pair of forwardmost upright structures, each connected to a respective side rail structure, to thereby form a pair of A-pillars. A pair of roof rail structures are included, a forward end of each being connected to an upper end of an associated A-pillar, a rearward ring assembly connected at upper portions thereof with the roof rail structure and at bottom portions thereof with the side rail structures. The rearward ring assembly further includes a tubular hydroformed and inverted U-shaped upper member having a cross portion and a pair of leg portions extending downwardly from opposite ends of the cross portion, a pair of tubular hydroformed side members, and a cross structure rigidly connected in ring-forming relation between the second ends of the side members.

U.S. Patent Application Publication No. 2005/0088012, to Yoshida, teaches a vehicle front pillar with inner and outer frame members joined into a substantially tubular shape. A fore portion of the inner frame member is oriented toward the front of the vehicle and has at least one bent portion formed thereon so as to serve as a shock absorbing section. A rear portion of the inner frame member is oriented toward the back of the vehicle and has a reinforced member of a closed sectional structure attached thereto so as to serve as a high-rigidity section. The reinforcing member may have a circular or rectangular cross-sectional shape.

Finally, Yamamoto et al., U.S. Pat. No. 6,692,065, teaches a framing structure for arrangement around a vehicle door opening produced by a hydraulically tube-formed tubular framework disposed inside the vehicle door opening to form a basic framing. An outer panel us joined to the tubular framework by welding. The inner side of the tubular framework is an inner wall within the vehicle. The outer side of the tubular framework, facing the outer panel, is a stiffening wall. The stiffening wall is hidden within a closed spaced between the outer panel and the inner wall.

SUMMARY OF THE PRESENT INVENTION

The present invention discloses an elongated structural member and associated method for producing, and which is created according to any of a roll-forming, extrusion manufacturing, or hydroforming process, the structural member incorporating either an integrally formed or welded on flange hemmed over, providing a flange to spot-weld additional body panels, e.g., door, window mounting structure or other structure panels, to the structural member. The closed section rolled components, defining the elongated structural member, replace a multi-piece stamped construction with a simple single piece section and can either be rolled or extruded straight, or stretch bent into a curved or compound curved environment.

The present construction eliminates individual components or steps within the manufacturing process of automobile impact and structural component, such as, increases in steel gages, additional reinforcement members, and/or complex manufacturing operations. This in turn increases tooling and handling costs associated with conventional manufacturing processes as provided in the prior art.

Typical roof structures include an A-pillar, a roof rail, and B or C pillars for vehicle reinforcement. The present invention combines these commonly individual members by forming a one-piece structural member with integral weld flanges. Additional to pillar applications, the elongated structural member of the present invention may also be reconfigured for application to a lower rocker panel application.

The one-piece roll formed and stretch-bent component, (or otherwise fixture formed structural component), replaces (in the disclosed application) the following components of a roof rail system: 1) an inner A-pillar panel, 2) an outer A-pillar panel, 3) an A-pillar reinforcement, 4) an inner-side roof rail panel, 5) an outer-side roof rail panel, 6) an A-pillar extension, and 7) a C-pillar reinforcement, all used in typical body structure constructions. As a result, the present invention has a tooling advantage where it eliminates many stamped tool dies, weld machines, weld fixtures, and checking fixtures and also provides a weight advantage, if the martensitic alternative should it be required.

BRIEF DESCRIPTION OF THE DRAWINGS

Reference will now be made to the attached drawings, when read in combination with the following detailed description, wherein like reference numerals refer to like parts throughout-the several views, and in which:

FIG. 1 is a side view of a one-piece, tubular member with an integrated welded flange;

FIG. 2 is a close-up of FIG. 1 showing a section of the one-piece, tubular member with an integrated welded flange;

DESCRIPTION OF THE PREFERRED EMBODIMENT

Figure 3:
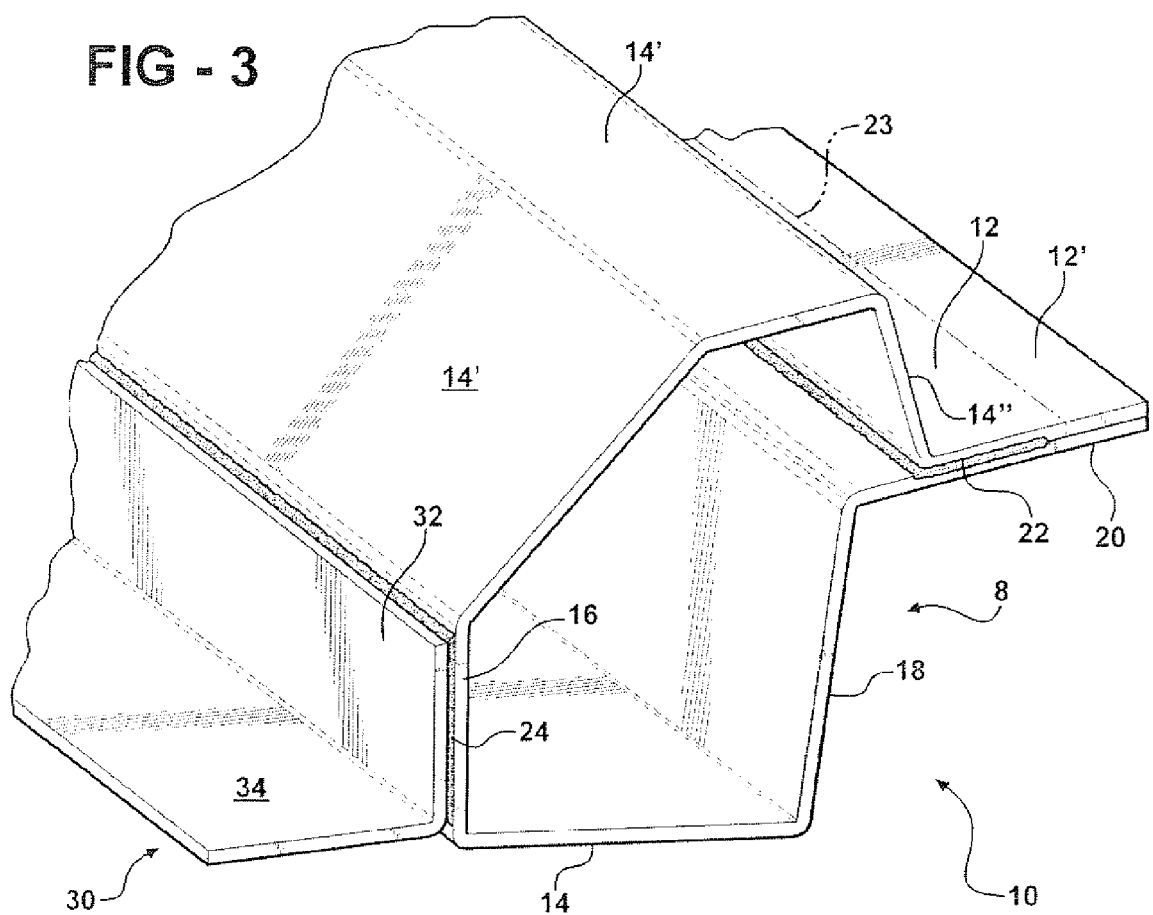
FIG. 3 is a perspective view of a one-piece, single flanged, tubular pillar with a welded additional flange.

Referring to accompanying drawings, a preferred embodiment of the present invention will now be described as follows. A roof structure, generally illustrated at 40, (FIG. 1), includes an A-pillar section 10, a roof rail section 42, and a B-pillar or C-pillar section 60.

FIG. 2 presents an enlarge sectional view of that shown in FIG. 1, of the A-pillar section 10 and which includes a one-piece tubular member 8 and a welded flange member 30. The one-piece tubular member 8 replaces the inner and outer side panels associated with conventional A-pillars and roof rails and the additional A-pillar extension member, thereby reducing the manufacturing and assembly costs of additional parts and forming steps.

The tubular shape of the roof structure 40 increases the structural integrity of the entire member and as a result, the strengthened roof structure 40 eliminates the need of an additional A-pillar reinforcement insert. As was further previously described, the elongated structural member of the present invention is also suitable for incorporation into other applications, not limited to rocker panels, bumper configurations, and the like.

The one-piece tubular member is further not limited to being employed over the length of the entire roof structure 40. In variations of the roof structure 40, the one-piece tubular member 8 may be limited in length to the A-pillar section 10, the roof rail section 42, and/or the B or C pillar sections 60. The above said, forming these sections separately requires additional welding and/or bonding subsequent steps to join the members together, and which may increase manufacturing costs.

Figure 4:
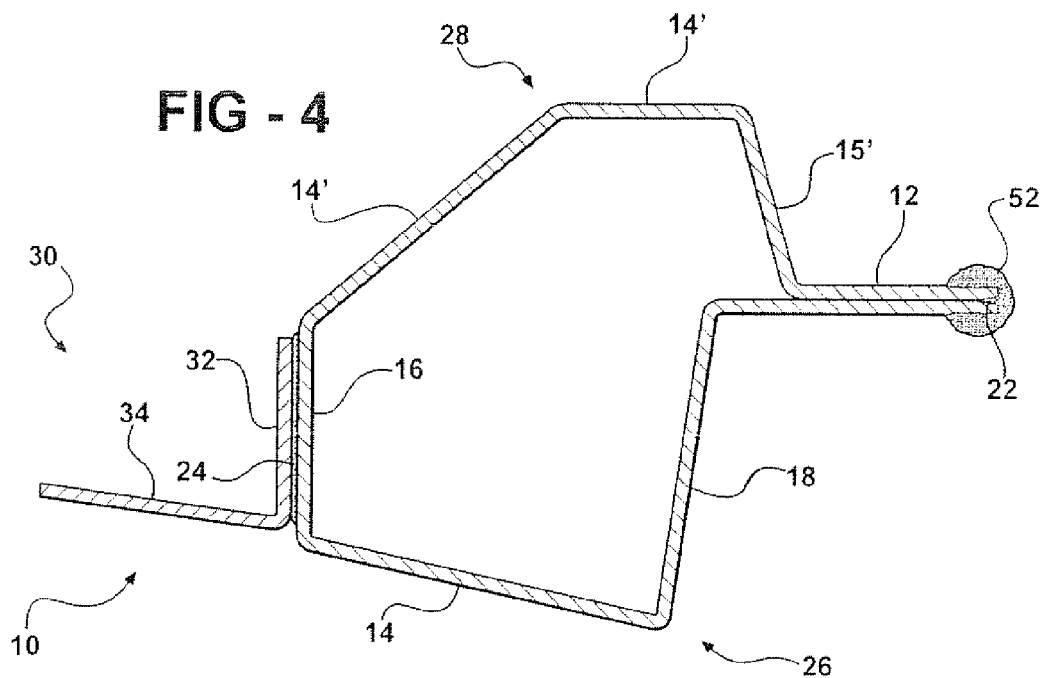
FIG. 4 is a cross section, taken along line A-A in FIG. 1, of the one-piece, single flanged, tubular pillar with a welded additional flange according to the present invention.

Referring further to FIG. 4 (as well as also to the perspective view of FIG. 3), the cross-section of the A-pillar section 10, taken across the A-A cross section of the roof structure 40 (FIGS. 1-2), again illustrates the one-piece tubular member 8 and the welded flange member 30, each which is formed of steel. The one-piece tubular member 8 (FIG. 4) includes a top wall 24, an outer panel 26, and an inner panel 28, these typically being formed as a one-piece member, and then subsequently bent to close the pillar structure. The outer panel 26 further includes a side wall 14, a bottom wall 18, and a flange wall 20, whereas the inner panel 28 further includes side walls 14' and 14", a bottom wall 15', and a flange wall 12, with a top wall 16 joining the outer and inner panels.

After the subsequent bending of the roll-formed sheet metal, the one-piece tubular member 10 obtained exhibits a closed, and thereby polygonal shaped, e.g. such as any multi-sided article including triangular, rectangular, pentagonal, hexagonal, etc., section by, such as by welding as referenced at 22, this further creating an integral flange between the respective outer and inner flange walls 20 and 12 for supporting a vehicular component. In doing so, the one-piece tubular member 10 forms a first selected and integrally formed (e.g. door seal) flange, see as further generally referenced at 50. The door seal flange 50 includes a door seal 52 (see again FIG. 4) surrounding the outer flange wall 20 and inner flange wall 12.

The top wall 16 of one-piece tubular member 8, (FIG. 4), is further joined to the bottom wall 32 of the welded flange member 30 through weld 24, applied therebetween. As a result, an associated leg of the welded flange member 30 further extends upward from the one-piece tubular member 10, this forming a side wall 34 upon which may be supported a glass window, (not illustrated), and which may further be added to the one-piece tubular member 8 in a subsequent manufacturing step.

The subsequent attachment step of the secondary (welded) flange member 30 can also be eliminated if the one-piece tubular member 8 is limited in length to the A-pillar section 10 or does not extend the full length of the roof structure 40, (FIG. 1). The above said, a preferred embodiment envisions that a single configured and integrated flange (such as illustrated at 50 and produced by configured portions 12 and 20) is capable of being created by the roll forming of the desired steel sheet material.

As further again referenced in FIG. 3, a selected portion of either wall 12 or 20 (and referenced by wall portion 12' defined by axially extending phantom line 23) is desirously sectioned along and outside of the weld location 22. The purpose for doing this is to reduce the overall thickness of the flange wall (i.e. from a two-wall to a single wall thickness), this in order to provide improved structural integrity as it is found that a two layer welded assembly exhibits superior holding properties as compared to a three layer configuration.

Given further the limitations associated with roll forming techniques, it is typically understood that any additional flanges (e.g. such as that shown at 30) are separately installed such as by welding. However, the present invention does envision forming configurations and/or applications (roll forming, hydro-forming or the like) whereby more than flange may be integrally formed into an elongated structural member produced according to the present invention.

The polygonal cross-section of the one-piece tubular member 10, (again FIG. 4), is again not limited to the preferred embodiment of the present invention. Due to ever changing demands for vehicle styling, the need for stronger vehicle members and smaller packaging is essential. As a result, in many situations, variable cross-sections and contrasting outer and inner pillar panels are highly desired. Roll-forming, among other desirable forming techniques, allows and enables variations in outer and inner pillar panel construction.

Given the above structural description, the method of forming of the roof structure 40, (again FIG. 1), will now be briefly summarized. The one-piece tubular member and welded flange member are preferably formed from thin steel sheet, which during the roll forming process is a substantially continuous sheet supplied from a large coil. The width of the steel sheet is selected based on the desired finished dimension of the tubular and welded flange members to permit the creation of single or multiple members simultaneously. The initial width of the flat steel sheet, as provided in the coil, thus substantially corresponds to the width of the predetermined quantity of members if flattened out into a planar condition.

The flattened steel sheet is supplied from the coil into a roll-forming mill, which, in a conventional and known manner, progressively reforms the flat steel sheet as it passes through the mill so that, upon leaving the mill, the steel sheet is longitudinally formed. The continuous corrugated sheet is then fed to a cut-off press, which cuts the continuous corrugated sheet at desired spaced distances corresponding to the desired lengths of the finished roof structure(s).

In a further step, the roof structure(s) is heated at an elevated temperature, which is sufficient to bring about a metallurgical transformation in the metallic members loaded therein. In the preferred method, this metallurgical is an austenizing transition, and in that regard, the parts are heated to a temperature in excess of 900° C.

Following the appropriate heat treatment the roof structure(s) is quenched. The quench fluid is typically a liquid, and generally a water-based liquid, although other quenching media may be employed in the art. The quenching step hardens the metal and locks in the shape imposed thereupon by the forming (roll-forming) step. The resultant structural member consists of Ultra High Strength Steel (UHSS) and therefore has a smaller gage thickness and more importantly requires less package spacing. As a result, the UHSS pillar more efficiently meets vehicle impact standards while the conventional prior-art low-strength steel member requires a thicker gage and/or additional reinforcement structures to meet the same vehicle standards.

Although a particular preferred embodiment of the invention has been disclosed in detail for illustrative purposes, it will be recognized that variations or modifications of the disclosed apparatus, including the rearrangement of parts, lie within the scope of the present invention and without departing from that of the appended claims.

We claim:

1. A structural supporting article for use in a vehicle, comprising:
    an elongated, interiorly hollowed and polygonal one piece body having a selected arcuate lengthwise configuration and defining a closed tubular shape, said body corresponding in placement to at least one of an A, B, and C vehicle pillar;
    a first component supporting flange, integrally formed by overlapping flange walls of said body and establishing a single material, said flange walls projecting in at least a partially lengthwise extending fashion from said closed tubular shape; and
    a secondary component supporting flange affixed to a further cross sectional location associated with said body.

2. The structural article as described in claim 1, said body exhibiting a specified shape and size and being fabricated from steel.

3. The structural article as described in claim 2, said steel further comprising martensitic steel.

4. The structural article as described in claim 1, said roof pillar configuration defined by said body further comprising at least one of an inner A-pillar panel, an outer A-pillar panel, an A-pillar reinforcement, an inner-side roof rail panel, an outer-side roof rail panel, an A-pillar extension, and a C-pillar reinforcement.

5. The structural article as described in claim 1, said body exhibiting a specified shape and size and being constructed according to at least one of a roll forming process and a hydro-forming process.

6. The structural article as described in claim 1, said body exhibiting a combined arcuate elongated configuration and at least one of a rectangular, pentagonal and a hexagonal shaped cross sectional configuration.

7. The structural article as described in claim 1, further comprising sectioning a portion of a selected and abutting flange outward of a weld location securing said walls together.

8. The structural article as described in claim 1, said secondary flange being affixed to said body by at least one of an adhesive, a weld, brazing, soldering and mechanical fasteners.

* * * * *

UNITED STATES PATENT AND TRADEMARK OFFICE
CERTIFICATE OF CORRECTION

PATENT NO. : 7,585,017 B2  Page 1 of 1
APPLICATION NO. : 11/430373
DATED : September 8, 2009
INVENTOR(S) : Zimmerman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Fourteenth Day of September, 2010

David J. Kappos
*Director of the United States Patent and Trademark Office*